Patented Jan. 23, 1951

2,539,007

UNITED STATES PATENT OFFICE 2,539,007

CIRCUIT ARRANGEMENT FOR GENERATING A VOLTAGE VARYING LINEALLY WITH THE TIME

Lourens Blok and George Philip Roszbach, Eindhoven, Netherlands, assignors, by mesne assignments, to Hartford National Bank and Trust Company, Hartford, Conn., as trustee Application April 10, 1946, Serial No. 660,870
In the Netherlands June 8, 1943

Section 1, Public Law 690, August 8, 1946
Patent expires June 8, 1963

4 Claims. (Cl. 250—27)

Circuit-arrangements for generating a voltage varying lineally with the time are known, in which a condenser becomes charged or discharged with a constant current via an electronic valve, for example, a pentode which by means of an aperiodic impulse or periodically occurring pulses is caused to become operative transiently or intermittently.

It has been ascertained by the applicant that when using such a circuit-arrangement for generating a voltage suitable for use as a time-base voltage for the reproduction of very transient, aperiodic phenomena (for example $10^{-8}$ seconds) or of phenomena of very high frequency (for example of from $10^6$ to $10^9$ c./s.) by oscillographic means the variation of the output voltage obtained from the condenser diverges appreciably from the desired straight line relationship directly upon the electronic tube having become operative. As was ascertained in addition, these divergences are due inter alia to smoothing of the front of the control impulse for putting the electron tube into operation owing to the finite time constant of the input circuit of the tube and of the parasitic reactances of the supply leads for the control impulse which under certain conditions are comparatively long.

According to the invention, the said divergences are restricted by forming the output voltage of the circuit to be used as a time-base voltage by the condenser voltage and by an auxiliary voltage which is proportionate to the charging or discharging current of the condenser and which has a suitably chosen polarity.

In order to permit of restricting as far as possible any residual divergences from the desired linear course of the output voltage and also in view of any modifications of the input circuit of the charging or discharging tube or of the tube itself, the amplitude of the auxiliary voltage is preferably variable.

The required auxiliary voltage may be obtained from the condenser voltage via a differentiating network.

One embodiment of the circuit-arrangement according to the invention to be preferred on account of its simplicity by connecting a resistance in series with the condenser and by using the voltage across the series combination thus set up to form the output voltage. This circuit-arrangement yields the effect aimed at no matter whether the voltage varying lineally with the time is generated by charging or discharging the condenser.

Figure 1:
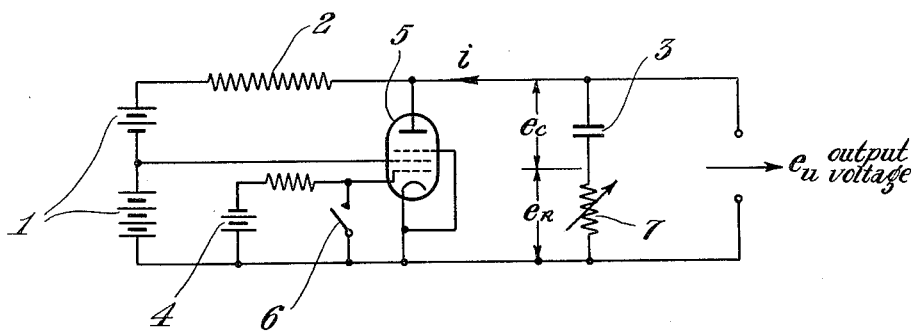
Figure 2:
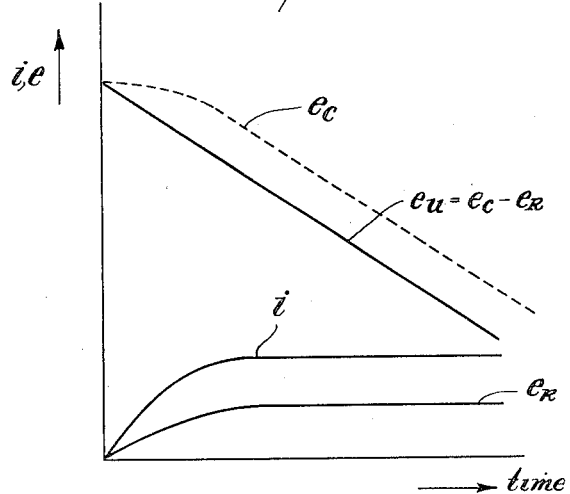

In order that the invention may be clearly understood and readily carried into effect, it will now be explained more fully with reference to the accompanying drawing, in which Figure 1 represents a circuit-arrangement according to the invention of the last-mentioned type for the generation of an aperiodic time-base voltage as required when rendering visible very transient, aperiodic phenomena by oscillographic means, and Figure 2 shows some few graphs for explaining the operation of the circuit-arrangement shown in Figure 1.

The circuit-arrangement shown comprises a condenser 3 which is connected permanently to a battery 1 via a very high ohmic resistance 2 and to which a pentode-amplifying tube 5 normally blocked by a negative control-grid bias 4 is connected in parallel.

The pentode 5 may be suddenly energized by closing a switch 6 lying between the control-grid and the cathode of the tube or by a control impulse obtained in a different manner and supplied to the control-grid, after which the condenser 3 is discharged with a current of constant strength and the voltage across the condenser decreases lineally with the time.

However, in the circuit-arrangement shown in the simplest possible manner due to the finite time constant of the input circuit of the tube (input capacity of the tube and resistance in the short-circuited control-grid circuit), some time will elapse between the moment of closure of the switch 6 and the moment at which the potential of the control-grid corresponds with that of the cathode. Even owing to this, and all the more intensely in the practical construction of the circuit-arrangement by reason of the then frequently comparatively high parasitic reactances of the input circuit of the tube, the condenser discharge current initially increases exponentially, as denoted in Figure 2 by $i$, as a function of time. Accordingly, the condenser voltage (confer $ec$ in Figure 2) initially decreases less rapidly than is required for the obtainment of a straight line relationship varying with time. In this connection it must be pointed out explicitly that in practice smoothing of the front of the control-impulse may be due to many other causes, and moreover, in some cases, the phenomenon to be observed acts itself as a control impulse.

In the circuit-arrangement described an improved time-base voltage is always obtained by connecting, in accordance with the invention, a resistance 7, preferably variable, of low value, for example 120 ohms in series with the condenser 3 and by utilizing the voltage across this series combination as an output voltage. During the condenser discharge the voltage across the resistance 7 is naturally proportionate to the discharge current of the condenser and is designated $e_R$ in Figure 2. As the voltages across the resistance 7 and the condenser 3 during the discharge period are of opposite polarity, the output voltage $e_U$ in Figure 2 is obtained by difference formation of the voltages $e_C$ and $e_R$. As is apparent from this, the measure according to the invention ensures a remarkable improvement as regards the straight line relationship of the output voltage.

What we claim is:

1. Apparatus for generating a voltage varying linearly with time comprising a network constituted by a storage capacitance connected in series with a resistance, a source of constant potential coupled in parallel with said network, an electron discharge device including a control electrode, said device having a constant-current characteristic and being connected across said network, and an input circuit connected to said control electrode including means to impose a bias voltage on said control electrode to maintain said device normally non-conductive and means to reduce the bias on said control electrode to render said device conductive for a predetermined period whereby said network is discharged therethrough, said input circuit having a finite time constant, said resistance having a value at which the non-linear portion of voltage developed across said resistance during the conduction of said device by reason of said finite time constant has a curvature corresponding to the non-linear portion of the voltage developed across said capacitance whereby the resultant voltage developed across said network varies linearly with time during the conductive period of said device.

2. Apparatus for generating a voltage varying linearly with time comprising a network constituted by a storage capacitance connected in series with a resistance, a source of constant potential coupled in parallel with said network, a pentode electron discharge device including a control grid, said device being connected across said network, and an input circuit connected to said control grid including means to impose a bias voltage on said control grid to maintain said device normally non-conductive and means to reduce the bias on said control electrode to render said device conductive for a predetermined period whereby said network is discharged therethrough, said input circuit having a finite time constant, said resistance having a value at which the non-linear portion of voltage developed across said resistance during the conduction of said device by reason of said finite time constant has a curvature corresponding to the non-linear portion of the voltage developed across said capacitance whereby the resultant voltage developed across said network varies linearly with time during the conductive period of said device.

3. Apparatus for generating a voltage varying linearly with time comprising a network constituted by a storage capacitance connected in series with a resistance, a source of constant potential coupled in parallel with said network, an electron discharge device including a cathode, a control grid, a screen grid, a suppressor grid and an anode, said cathode being connected to one end and said anode being connected to the other end of said network, said screen grid being connected to an intermediate point in said source, said suppressor grid being connected to said cathode, and an input circuit connected to said control grid including means to impose a bias voltage on said control grid to maintain said device normally non-conductive and means to reduce the bias on said control grid to render said device conductive for a predetermined period whereby said network is discharged therethrough, said input circuit having a finite time constant, said resistance having a value at which the non-linear portion of voltage developed across said resistance during the conduction of said device by reason of said finite time constant has a curvature corresponding to the non-linear portion of the voltage developed across said capacitance whereby the resultant voltage developed across said network varies linearly with time during the conductive period of said device.

4. In an oscillographic system for exhibiting transient, aperiodic phenomena, a time base generator comprising a network constituted by a storage capacitance connected in series with a resistance, a source of constant potential coupled in parallel with said network, an electron discharge device including a control electrode, said device having a constant-current characteristic and being arranged across said network, and an input circuit connected to said control grid including means to impose a bias voltage on said control electrode to maintain said device normally non-conductive and means responsive to the advent of the transient to be observed for reducing the bias on said control electrode to a value rendering said device conductive for a predetermined period, said input circuit having a finite time constant, said resistance having a value at which the non-linear portion of voltage developed across said resistance during the conduction of the device by reason of said finite time constant has a curvature corresponding to the non-linear portion of the voltage developed across said capacitance whereby the resultant voltage developed across said network varies linearly with time during the conductive period of said device.

LOURENS BLOK.
GEORGE PHILIP ROSZBACH.

REFERENCES CITED

The following references are of record in the file of this patent:

UNITED STATES PATENTS

| Number | Name | Date |
|---|---|---|
| 2,040,813 | Oglabinsky | May 12, 1936 |
| 2,052,184 | Lewis | Aug. 25, 1936 |
| 2,265,290 | Knick | Dec. 9, 1941 |